(12) United States Patent
Oyama

(10) Patent No.: US 10,096,288 B2
(45) Date of Patent: Oct. 9, 2018

(54) DISPLAY DEVICE

(71) Applicant: Japan Display Inc., Tokyo (JP)

(72) Inventor: Atsunori Oyama, Tokyo (JP)

(73) Assignee: Japan Display Inc., Tokyo (JP)

( * ) Notice: Subject to any disclaimer, the term of this patent is extended or adjusted under 35 U.S.C. 154(b) by 99 days.

(21) Appl. No.: 15/281,461

(22) Filed: Sep. 30, 2016

(65) Prior Publication Data

US 2017/0103715 A1   Apr. 13, 2017

(30) Foreign Application Priority Data

Oct. 13, 2015  (JP) ................................. 2015-202286

(51) Int. Cl.
| | |
|---|---|
| *G09G 3/34* | (2006.01) |
| *G02F 1/1334* | (2006.01) |
| *G02F 1/1335* | (2006.01) |
| *G09G 3/20* | (2006.01) |
| *G09G 3/36* | (2006.01) |
| *G02F 1/1343* | (2006.01) |
| *G02F 1/1347* | (2006.01) |

(52) U.S. Cl.
CPC ......... *G09G 3/3413* (2013.01); *G02F 1/1334* (2013.01); *G02F 1/133504* (2013.01); *G02F 1/133514* (2013.01); *G09G 3/2003* (2013.01); *G09G 3/36* (2013.01); *G09G 3/3688* (2013.01); *G02F 1/13476* (2013.01); *G02F 1/133606* (2013.01); *G02F 1/134309* (2013.01); *G02F 2001/133601* (2013.01); *G02F 2201/121* (2013.01); *G02F 2201/123* (2013.01); *G09G 2300/0452* (2013.01); *G09G 2320/0271* (2013.01); *G09G 2320/0646* (2013.01); *G09G 2320/0666* (2013.01)

(58) Field of Classification Search
CPC combination set(s) only.
See application file for complete search history.

(56) References Cited

U.S. PATENT DOCUMENTS

| | | | |
|---|---|---|---|
| 2011/0249221 A1 | 10/2011 | Uchida et al. | |
| 2012/0075274 A1* | 3/2012 | Ueno | ................... G09G 3/3426 345/207 |
| 2012/0274867 A1 | 11/2012 | Shinkai et al. | |
| 2013/0258711 A1 | 10/2013 | Okuyama et al. | |

(Continued)

FOREIGN PATENT DOCUMENTS

| | | |
|---|---|---|
| JP | 2012-151081 A | 8/2012 |
| JP | 2012-234706 A | 11/2012 |

*Primary Examiner* — Jennifer Mehmood
*Assistant Examiner* — Deeprose Subedi
(74) *Attorney, Agent, or Firm* — K&L Gates LLP

(57) ABSTRACT

A display device according to an aspect of the present invention includes: a polymer dispersed liquid crystal panel; a light source device that emits illumination light to an end surface of the polymer dispersed liquid crystal panel; a video signal control unit that corrects a video signal to generate a video control signal, the video signal being corrected so as to cancel a change in a color of the illumination light when the illumination light propagates through inside the polymer dispersed liquid crystal panel; and a display panel that modulates the illumination light that has propagated through the inside of the polymer dispersed liquid crystal panel and is scattered by the polymer dispersed liquid crystal panel, based on the video control signal.

9 Claims, 8 Drawing Sheets

(56) References Cited

U.S. PATENT DOCUMENTS

| | | |
|---|---|---|
| 2014/0104521 A1 | 4/2014 | Nishimura et al. |
| 2014/0139461 A1 | 5/2014 | Furukawa et al. |
| 2014/0232834 A1 | 8/2014 | Sato et al. |
| 2014/0300528 A1* | 10/2014 | Ebisui ................ G02B 27/2214 345/32 |
| 2016/0070047 A1 | 3/2016 | Okuyama et al. |
| 2016/0231497 A1 | 8/2016 | Kato |
| 2018/0053474 A1* | 2/2018 | Miyata ................ G09G 3/3413 |

* cited by examiner

DISPLAY DEVICE

CROSS-REFERENCE TO RELATED APPLICATIONS

This application claims priority from Japanese Application No. 2015-202286, filed on Oct. 13, 2015, the contents of which are incorporated by reference herein in its entirety.

BACKGROUND

1. Technical Field

The present disclosure relates to a display device.

2. Description of the Related Art

A display device that uses a polymer dispersed liquid crystal panel as a light guide plate of a backlight has been known (see Japanese Patent Application Laid-open Publication No. 2012-151081). A light source is disposed on an end surface of the polymer dispersed liquid crystal panel. Illumination light emitted from the light source propagates through the inside of the polymer dispersed liquid crystal panel, and is emitted from the polymer dispersed liquid crystal panel. The polymer dispersed liquid crystal panel is disposed opposite to a display panel. The display panel modulates the illumination light emitted from the polymer dispersed liquid crystal panel, and displays an image.

The polymer dispersed liquid crystal panel includes two substrates provided with a transparent electrode, and a liquid crystal layer that is interposed between the two substrates. The illumination light propagates through the inside of the polymer dispersed liquid crystal panel, while transmitting through the liquid crystal layer and the electrode. A part of the illumination light is absorbed or scattered by the liquid crystal layer and the electrode. Whether the light is absorbed easily or scattered easily differs according to the wavelength of the light. Consequently, there is a possibility that the color of the illumination light may change while the illumination light propagates through the inside of the polymer dispersed liquid crystal panel, and a color shift may occur in the image.

SUMMARY

A display device according to a first aspect of the present invention includes: a polymer dispersed liquid crystal panel; a light source device that emits illumination light to an end surface of the polymer dispersed liquid crystal panel; a video signal control unit that corrects a video signal to generate a video control signal, the video signal being corrected so as to cancel a change in a color of the illumination light when the illumination light propagates through inside the polymer dispersed liquid crystal panel; and a display panel that modulates the illumination light that has propagated through the inside of the polymer dispersed liquid crystal panel and is scattered by the polymer dispersed liquid crystal panel, based on the video control signal.

A display device according to a second aspect of the present invention includes: a polymer dispersed liquid crystal panel; a light source device that emits illumination light to an end surface of the polymer dispersed liquid crystal panel; and a display panel that includes a color filter layer and modulates the illumination light that has propagated through inside the polymer dispersed liquid crystal panel and is scattered by the polymer dispersed liquid crystal panel, wherein a color of the color filter layer is adjusted, so as to cancel a change in a color of the illumination light when the illumination light propagates through the inside of the polymer dispersed liquid crystal panel.

DETAILED DESCRIPTION

Figure 1:
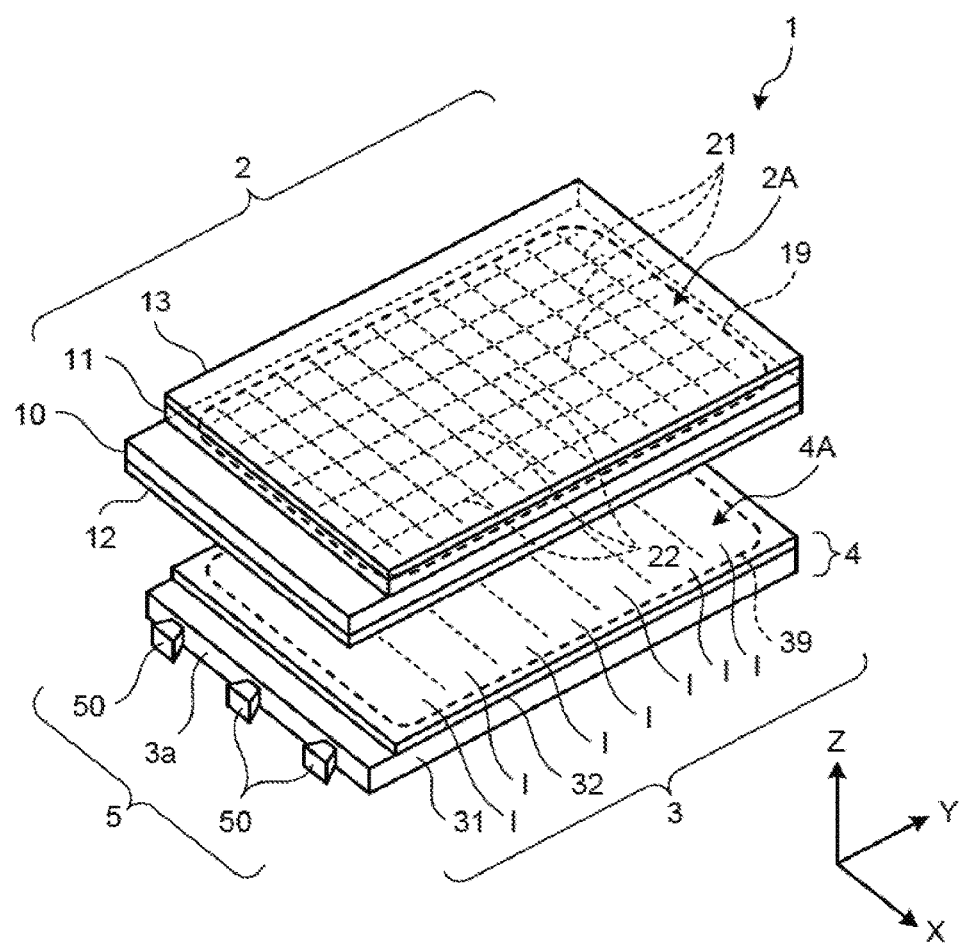
FIG. 1 is a perspective view illustrating a schematic configuration of a display device according to a first embodiment.

Modes (embodiments) for carrying out the invention will now be described in detail with reference to the accompanying drawings. It is not intended that the present invention be limited by what has been described in the following embodiments. Constituent elements described in the following include those that can be easily assumed by a person skilled in the art, or those substantially the same. Furthermore, the constituent elements described in the following can be combined as appropriate. The disclosure is merely an example, and appropriate modifications coming within the spirit of the invention, which are easily conceived by a person skilled in the art, are intended to be included within the scope of the invention as a matter of course. The accompanying drawings schematically illustrate widths, thicknesses, shapes, and the like of each element for clarity of illustration, compared to actual embodiments. However, such schematic illustration is merely an example, and not intended to limit the interpretation of the present invention. Furthermore, in the present application and drawings, the constituent elements similar to those in the previous drawings denote the same reference numerals, and thus the detailed description may be omitted as appropriate.

First Embodiment

Figure 2:
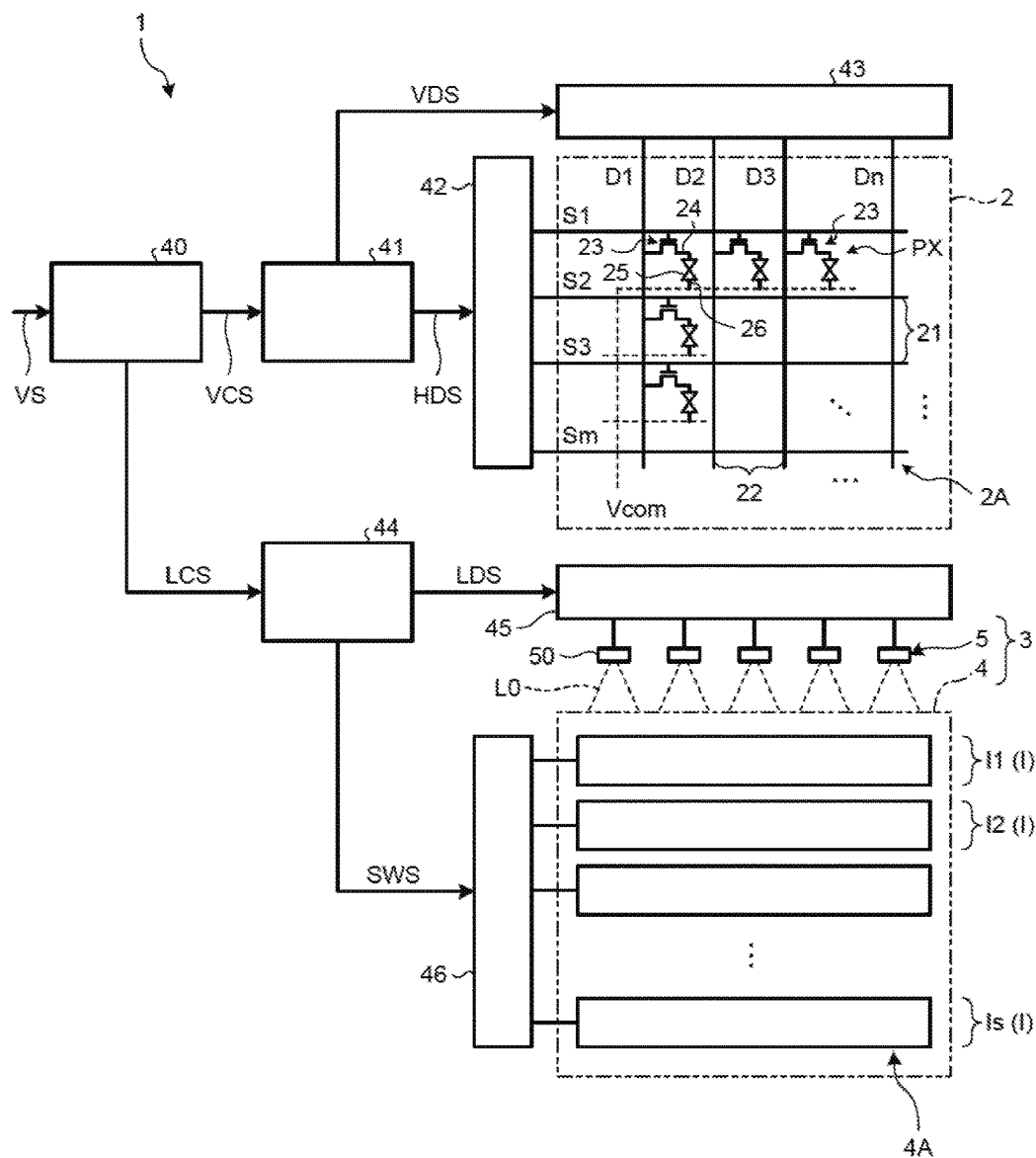
FIG. 2 is a block diagram illustrating an electrical configuration of the display device.
Figure 3:
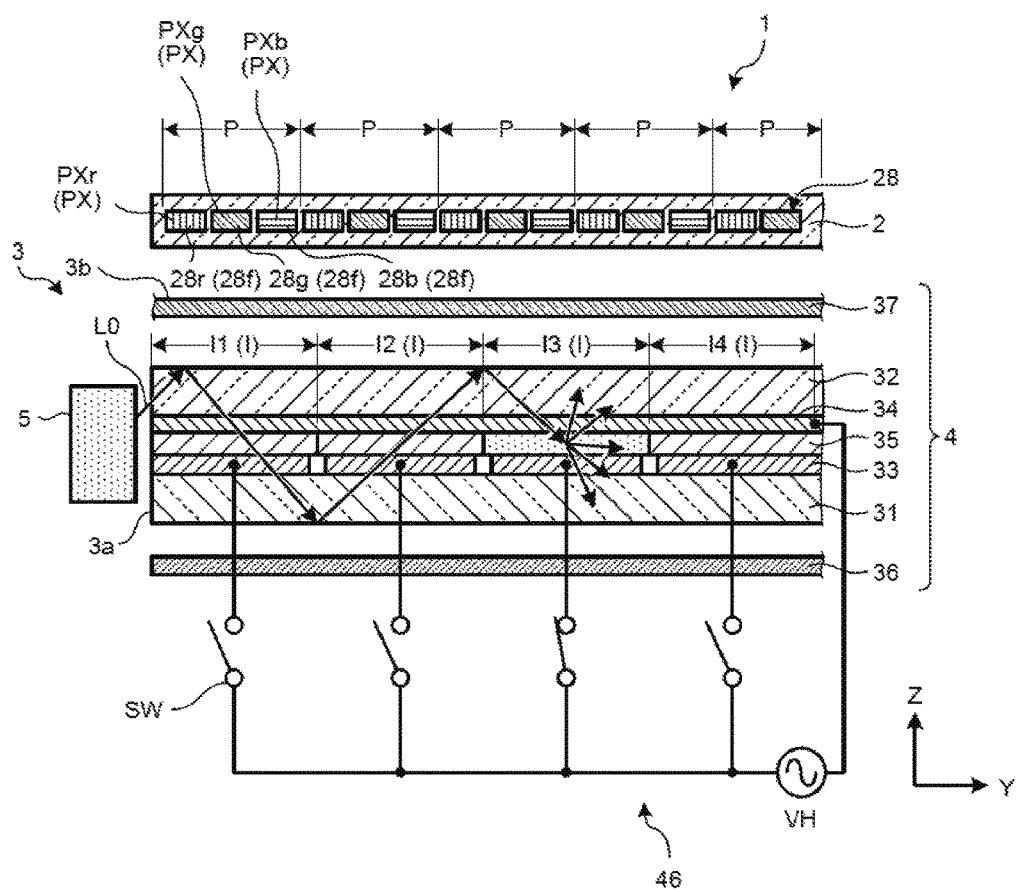
FIG. 3 is a sectional view illustrating a schematic configuration of the display device.
Figure 4:
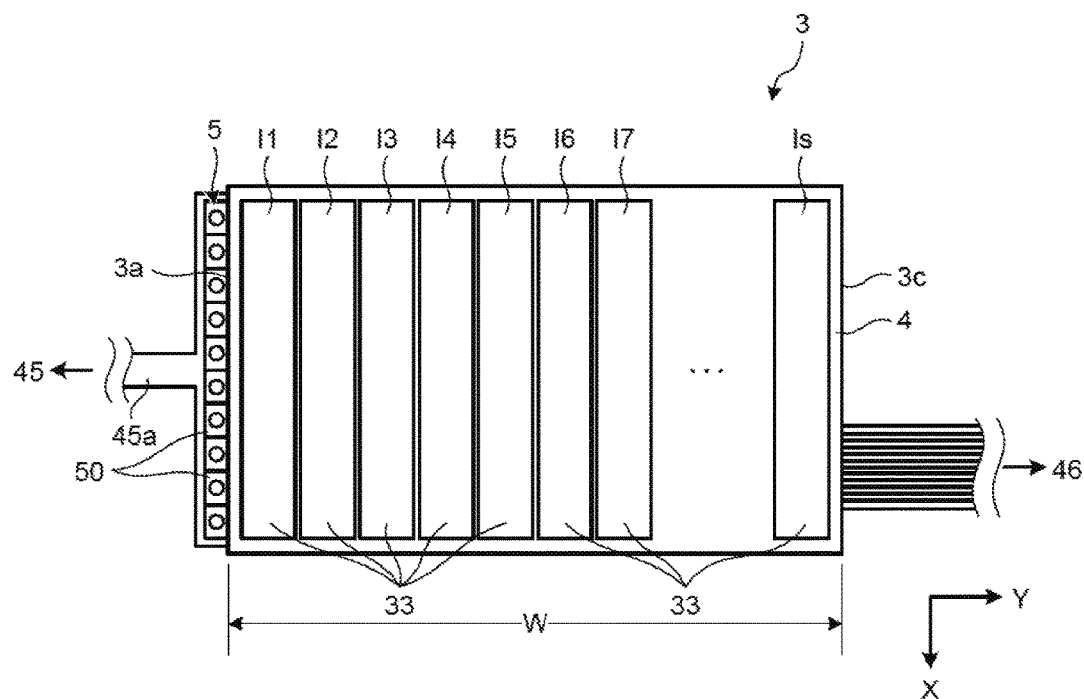
FIG. 4 is a plan view of a backlight provided in the display device.

FIG. 1 is a perspective view illustrating a schematic configuration of a display device 1 according to a first embodiment. FIG. 2 is a block diagram illustrating an electrical configuration of the display device 1. FIG. 3 is a sectional view illustrating a schematic configuration of the display device 1. FIG. 4 is a plan view of a backlight 3 provided in the display device 1. Hereinafter, an XYZ coordinate system is used to describe the shape and arrangement of the constituent elements.

As illustrated in FIG. 1 and FIG. 2, the display device 1 includes a display panel 2, the backlight 3, a video signal control unit 40, a gradation control unit 41, a gate line drive unit 42, a data line drive unit 43, a backlight control unit 44, a light source drive unit 45, and a sub-illumination region switching unit 46.

As illustrated in FIG. 1, the display panel 2 includes a first substrate 10, a second substrate 11, a first polarizing plate 12, and a second polarizing plate 13. The second substrate 11 is arranged opposite to the first substrate 10. A sealing material 19 in a rectangular frame shape is provided on the periphery of a counter region where the first substrate 10 and the second substrate 11 are disposed opposite from each other. A liquid crystal layer 25 (see FIG. 2) is sealed in a space enclosed by the first substrate 10, the second substrate 11, and the sealing material 19. A display region 2A is provided inside the sealing material 19. The first polarizing plate 12 is provided on the outer surface side of the first substrate 10. The second polarizing plate 13 is provided on the outer surface side of the second substrate 11.

As illustrated in FIG. 2, a plurality of gate lines 21 that extend in the X direction and a plurality of data lines 22 that extend in the Y direction are provided on the display region 2A in a lattice pattern, when viewed from the Z direction. A thin film transistor 23 is provided at each intersection between the gate line 21 and the data line 22. The gate and the source of the thin film transistor 23 are electrically coupled to the gate line 21 and the data line 22, respectively. The drain of the thin film transistor 23 is electrically coupled to a pixel electrode 24.

A common electrode 26 that is common to each pixel electrode 24 is provided on the display region 2A. A common potential Vcom is applied to the common electrode 26, by a power supply unit, which is not illustrated. The orientation of the liquid crystal layer 25 is controlled by the electric field generated between the pixel electrode 24 and the common electrode 26. A single sub-pixel PX is an region where the orientation of the liquid crystal layer 25 is controlled by the single pixel electrode 24 and the common electrode 26. The display region 2A is formed of a plurality of the sub-pixels PX that are arranged in a matrix in the X direction and the Y direction.

As illustrated in FIG. 3, the display panel 2 includes a plurality of pixels P. Each of the pixels P includes the sub-pixels PX each displaying one of colors different from each other. The display panel 2 has a color filter layer 28 that includes a plurality of color filters 28f that correspond to the sub-pixels PX, respectively.

In the present embodiment, for example, the color filter layer 28 includes a red color filter 28r, a green color filter 28g, and a blue color filter 28b. A single pixel P includes a red sub-pixel PXr, a green sub-pixel PXg, and a blue sub-pixel PXb. However, the configuration of the color filter layer 28 and the pixel P is not limited thereto. The colors displayed by the three sub-pixels PX are not limited to red, green, and blue, and may also be yellow, cyan, and magenta. The number of the sub-pixels PX included in the pixel P is not limited to three, and may also be two, or four or more.

The backlight 3 is provided on the rear surface side of the display panel 2 (the side opposite from the side where an image is to be observed). The backlight 3 includes a polymer dispersed liquid crystal panel 4 and a light source device 5. The polymer dispersed liquid crystal panel 4 is disposed opposite to the display panel 2. The light source device 5 is disposed opposite to a first end surface 3a of the polymer dispersed liquid crystal panel 4 that extends in the X direction. The first end surface 3a opposite to the light source device 5 is a light incident surface. The light source device 5 emits illumination light L0 to the first end surface 3a of the polymer dispersed liquid crystal panel 4.

As illustrated in FIG. 1, for example, the light source device 5 includes a plurality of light sources 50. The light sources 50 are arranged side by side along the first end surface 3a. For example, the light sources 50 are light emitting diodes (LEDs) that each emits white illumination light L0 to the first end surface 3a. Each of the light sources 50 may be a point light source such as the LED or an organic electro luminescence (EL) device, or a linear light source such as a cold cathode fluorescent lamp (CCFL).

As illustrated in FIG. 3, the polymer dispersed liquid crystal panel 4 includes a third substrate 31, a fourth substrate 32, a liquid crystal layer 35, a reflective sheet 36, and a prism sheet 37. The third substrate 31 is disposed opposite to the fourth substrate 32. A sealing material 39 (see FIG. 1) in a rectangular frame shape is provided on the periphery of a counter region where the third substrate 31 and the fourth substrate 32 are disposed opposite from each other. The liquid crystal layer 35 is sealed inside a space enclosed by the third substrate 31, the fourth substrate 32, and the sealing material 39. The reflective sheet 36 is disposed opposite to the outer surface of the third substrate 31 (surface opposite from the liquid crystal layer 35) via an air layer. The prism sheet 37 is disposed opposite to the outer surface of the fourth substrate 32 (surface opposite from the liquid crystal layer 35) via an air layer.

As illustrated in FIG. 3 and FIG. 4, a plurality of first electrodes 33 that each extends in the X direction, are provided on the inner surface of the third substrate 31 (surface at the side of the liquid crystal layer 35). The first electrodes 33 are arranged side by side in the Y direction. A second electrode 34 opposite to the first electrodes 33 is provided on the inner surface of the fourth substrate 32 (surface at the side of the liquid crystal layer 35). The second electrode 34 is provided so as to overlap with the first electrodes 33, when viewed from the Z direction. The second electrode 34 serves as a common electrode that is common to the first electrodes 33.

For example, the liquid crystal layer 35 is a reverse mode liquid crystal layer, in which liquid crystals are dispersed in a gap within the polymer network formed in a lattice pattern. Voltage applied between the first electrode 33 and the second electrode 34 controls the orientation of the liquid crystal layer 35. If voltage VH is not applied between the first electrode 33 and the second electrode 34, the refractive indexes of the polymer and the liquid crystal match with each other, and the illumination light L0 does not scatter on the interface between the polymer and the liquid crystal. If the voltage VH is applied between the first electrode 33 and the second electrode 34, the refractive indexes of the polymer and the liquid crystal differ from each other, and the illumination light L0 will be scattered on the interface between the polymer and the liquid crystal.

A single sub-illumination region I is an region where the orientation of the liquid crystal layer 35 is controlled by the single first electrode 33 and the second electrode 34. The polymer dispersed liquid crystal panel 4 includes a plurality of the sub-illumination regions I where switching between a scattering state and a non-scattering state is independently controlled. The scattering state is a state in which the illumination light L0 is scattered. The non-scattering state is a state in which the illumination light L0 is not scattered. The switching between the scattering state and the non-scattering state is controlled by a switching element SW provided in the sub-illumination region switching unit 46. An illumination region 4A is formed of the sub-illumination regions I. The size of the illumination region 4A is substantially the same or larger than that of the display region 2A. The illumination region 4A is disposed opposite to the display region 2A.

The sub-illumination regions I are arranged side by side along a propagation direction (Y direction) of the illumination light L0. The distance between each of the sub-illumination regions I and the first end surface 3a (distance along the propagation direction of the illumination light L0) is different from each other. The illumination light L0 propagates in the Y direction, while being totally reflected within the polymer dispersed liquid crystal panel 4. The illumination light L0 is scattered by the sub-illumination region I that is switched to the scattering state. The illumination light L0 being scattered toward the third substrate 31 transmits through the third substrate 31, and is reflected by the reflective sheet 36 to the side of the display panel 2. The illumination light L0 being scattered toward the fourth substrate 32 transmits through the fourth substrate 32. The prism sheet 37 then controls the directivity of the illumination light L0 that has transmitted through the fourth substrate 32.

The illumination light L0 is emitted from the main surface (outer surface of the prism sheet 37) of the polymer dispersed liquid crystal panel 4 that is disposed opposite to the display panel 2. The main surface of the polymer dispersed liquid crystal panel 4 that is disposed opposite to the display panel 2 is a light emitting surface 3b of the backlight 3. The display panel 2 modulates the illumination light L0 that has propagated through the inside of the polymer dispersed liquid crystal panel 4 and is scattered by the polymer dispersed liquid crystal panel 4.

The display panel 2 and the backlight 3 are driven and controlled by the video signal control unit 40, the gradation control unit 41, the gate line drive unit 42, the data line drive unit 43, the backlight control unit 44, the light source drive unit 45, and the sub-illumination region switching unit 46 illustrated in FIG. 2.

The video signal control unit 40 generates a video control signal VCS and a backlight control signal LCS based on a video signal VS that is input from outside. The video signal VS includes gradation information relating to a gradation value of each of the sub-pixels PX. Hereinafter, a gradation value relating to gradation information included in the video signal VS is referred to as a first gradation value. For example, the first gradation value indicates values from 0 to 255.

The backlight control signal LCS is a signal that specifies the amount of light of the illumination light L0 to be emitted from the light source device 5, and that makes the light source device 5 emit the illumination light L0 at a predetermined timing. The amount of light of the illumination light L0 is set according to the brightness (for example, the average first gradation value of the sub-pixels PX included in the display portion) of an image on the display portion of the display panel 2, corresponding to the sub-illumination region I that is in the scattering state. For example, the amount of light of the illumination light L0 to be emitted from the sub-illumination region I is set small, for a portion where a dark image is to be displayed. The amount of light of the illumination light L0 that is emitted from the sub-illumination region I is set large, for the portion where a bright image is to be displayed. In this manner, compared to when the maximum amount of the illumination light L0 is constantly emitted to the entire display region 2A of the display panel 2, it is possible to reduce the consumption power and improve the contrast.

The video control signal VCS is a signal that defines which gradation value be applied to each of the sub-pixels PX on the display panel 2. The video control signal VCS includes gradation information relating to the gradation value of each of the sub-pixels PX. Hereinafter, a gradation value relating to the gradation value included in the video control signal VCS is referred to as a second gradation value. For example, the second gradation value indicates values from 0 to 255.

The video signal control unit 40 sets the second gradation value that is different from the first gradation value, by performing correction processing such as a gamma correction and an expansion process on the first gradation value. The video signal control unit 40 corrects the video signal VS to generate the video control signal VCS. The video signal VS is corrected so as to cancel the change in color of the illumination light L0. The change in color is generated when the illumination light L0 propagates through the inside of the polymer dispersed liquid crystal panel 4. The video signal control unit 40 adjusts the amount of the second gradation value, according to the distance between each of the sub-pixels PX and the first end surface 3a (distance along the propagation direction of the illumination light L0), while taking into account of the brightness and the change in color of the illumination light L0, that is generated when the illumination light L0 propagates through the inside of the polymer dispersed liquid crystal panel 4. The adjustment amount differs according to each color displayed by the sub-pixel PX.

The correction amount (difference between the first gradation value and the second gradation value) of the video signal VS to be supplied to each of the sub-pixels PX that displays an identical color, differs according to the distance between the sub-pixel PX and the first end surface 3a. For example, when an identical first gradation value is set for the sub-pixels PX that display the identical color, the second gradation value of each of the sub-pixels PX differs according to the distance between each of the sub-pixels PX and the first end surface 3a. Thus, the change in the amount of light of the illumination light L0 according to the propagation distance of the illumination light L0 is canceled, thereby suppressing the color shift in the image. When the identical first gradation value is set for the sub-pixels PX included in an identical pixel, the second gradation value of each of the sub-pixels PX differs according to variability in the amount of each light, when the light of the color to be displayed by each of the sub-pixels PX propagates through the inside of the polymer dispersed liquid crystal panel 4. Consequently, even if the color of the illumination light L0 has changed according to the position in the propagation direction, a color shift hardly occurs in the image to be displayed.

The gradation control unit 41 generates a horizontal drive signal HDS and a vertical drive signal VDS based on the video control signal VCS. The gate line drive unit 42 selects the gate lines 21 of the display panel 2 within a single vertical scanning period based on the horizontal drive signal HDS. The selection order of the gate lines 21 is optional. For example, the gate lines 21 are sequentially selected in the order of S1, S2, S3, . . . , Sm. The data line drive unit 43 supplies a gradation signal according to the second gradation value of each of the sub-pixels PX to the data lines 22 of the display panel 2, within a single horizontal scanning period, based on the vertical drive signal VDS. In this manner, the display panel 2 modulates the illumination light L0 that has propagated through the inside of the polymer dispersed liquid crystal panel 4 and is scattered by the polymer dispersed liquid crystal panel 4, based on the video control signal VCS. Consequently, an image in a size of one frame will be displayed.

The backlight control unit 44 generates a light source drive signal LDS and a sub-illumination region switching signal SWS, based on the backlight control signal LCS. The light source drive signal LDS is a signal that specifies the amount of light to be emitted from each of the light sources 50 and the emission timing. The sub-illumination region switching signal SWS is a signal specifying the timing when each of the sub-illumination regions I is switched to the scattering state.

The sub-illumination region switching unit 46 selects one or more of the sub-illumination regions I from the polymer dispersed liquid crystal panel 4 simultaneously or sequentially, within a single vertical scanning period, based on the sub-illumination region switching signal SWS. The sub-illumination region switching unit 46 then switches the selected one or more sub-illumination regions I to the scattering state. The light source drive unit 45 makes each of the light sources 50 emit light at a specified amount of light within a single horizontal scanning period, based on the light source drive signal LDS. In this manner, the illumination light L0 that is controlled by the light source drive unit 45 is emitted toward the display panel 2, from the selected one or more sub-illumination regions I.

For example, when scan driving for scanning the illumination light L0 in the vertical direction is performed in synchronization with the writing of the image, the sub-illumination region switching unit 46 sequentially selects the sub-illumination regions I of the polymer dispersed liquid crystal panel 4, within a single vertical scanning period, based on the sub-illumination region switching signal SWS. The sub-illumination region switching unit 46 then sequentially switches the sub-illumination regions I to the scattering state, in the order of I1, I2, I3, I4, . . . , Is, from the sub-illumination region on the upper stage side. The light source drive unit 45 makes each of the light sources 50 emit light at a specified amount of light, within a single horizontal scanning period, based on the light source drive signal LDS. In this manner, the illumination light L0 with the amount of light controlled by the light source drive unit 45 is sequentially emitted toward the display panel 2, from the sub-illumination regions I.

The illumination light L0 that is emitted from the light source device 5 propagates through the inside of the polymer dispersed liquid crystal panel 4 in the Y direction, and is emitted from the sub-illumination region I that is in the scattering state. The illumination light L0 that is emitted from the sub-illumination region I is modulated by the display panel 2, and is displayed as an image having a size corresponding to the sub-illumination region I. Because the positions of the sub-illumination region I that is in the scattering state change sequentially, an image in a size of one screen will be displayed.

When static drive is performed to turn on the entire illumination region 4A at once, the sub-illumination region switching unit 46 simultaneously selects the entire sub-illumination regions I of the polymer dispersed liquid crystal panel 4, within a single vertical scanning period, based on the sub-illumination region switching signal SWS. The sub-illumination region switching unit 46 then switches the entire sub-illumination regions I to the scattering state. The light source drive unit 45 makes each of the light sources 50 emit light at a specified amount of light, within a single horizontal scanning period, based on the light source drive signal LDS. In this manner, the illumination light L0 with the amount of light controlled by the light source drive unit 45 is emitted toward the display panel 2, from the sub-illumination regions I.

The illumination light L0 that is emitted from the light source device 5 propagates through the inside of the polymer dispersed liquid crystal panel 4 in the Y direction, and is simultaneously emitted from the entire sub-illumination regions I. The illumination light L0 that is emitted from each of the sub-illumination regions I is modulated by the display panel 2, and is displayed as an image having a size corresponding to the sub-illumination region I. In this manner, an image in a size of one screen will be displayed.

A part of the illumination light L0 that propagates through the inside of the polymer dispersed liquid crystal panel 4 is absorbed or scattered by the liquid crystal layer 35, the first electrode 33, and the second electrode 34 illustrated in FIG. 3. Whether the illumination light L0 can be easily absorbed or easily scattered, differs according to the wavelength of the light. For example, if the first electrode 33 and the second electrode 34 are formed of an oxide conductive film such as indium tin oxide (ITO), the first electrode 33 and the second electrode 34 easily absorb blue light. In the liquid crystal layer 35, a slight scattering may occur on the interface between the polymer and the liquid crystal, even if the interface is in the non-scattering state. However, the degree of scattering differs according to the wavelength. Consequently, for example, the color of the illumination light L0 may turn yellow at the position further away from the first end surface 3a, and a color shift may occur in the image.

Figure 5:
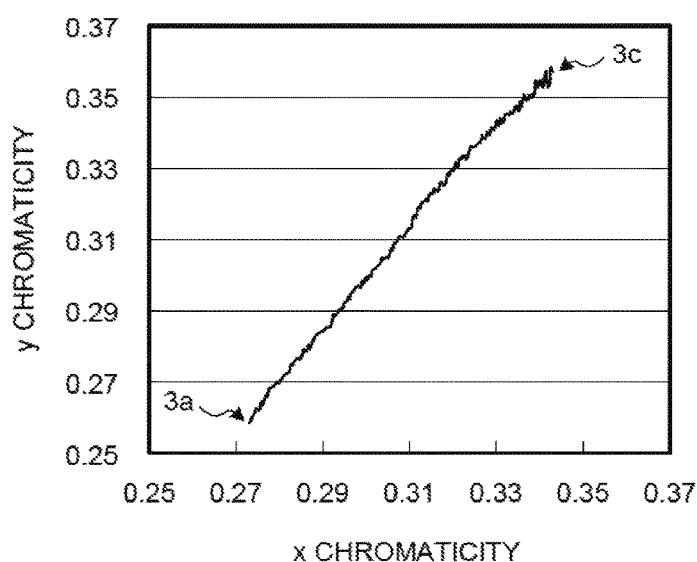
FIG. 5 is an xy chromaticity diagram illustrating an example of chromaticity variation in illumination light.

FIG. 5 is an xy chromaticity diagram illustrating an example of chromaticity variation in the illumination light L0, when the illumination light L0 propagates through the inside of the polymer dispersed liquid crystal panel 4. The actual line in FIG. 5 is obtained by plotting the chromaticity of the illumination light L0, at each position on the propagation path of the illumination light L0. The left side of the actual line indicates the chromaticity of the illumination light L0 on the first end surface 3a illustrated in FIG. 4. The right side of the actual line indicates the chromaticity of the illumination light L0 on a second end surface 3c (end surface opposite to the first end surface 3a along the propagation direction of the illumination light L0) illustrated in FIG. 4.

As illustrated in FIG. 5, when the white illumination light L0 enters the polymer dispersed liquid crystal panel 4, the color of the illumination light L0 changes continuously from the first end surface 3a to the second end surface 3c. In the example in FIG. 5, the chromaticity of the illumination light L0 at the vicinity of the first end surface 3a is (0.2783, 0.2528), and the chromaticity of the illumination light L0 at the vicinity of the second end surface 3c is (0.3404, 0.3569). The illumination light L0 is yellowish in color at the vicinity of the second end surface 3c. The illumination light L0 attenuates at rates different for each wavelength component, and the attenuation amount increases as the propagation distance of the illumination light L0 increases.

Figure 6:
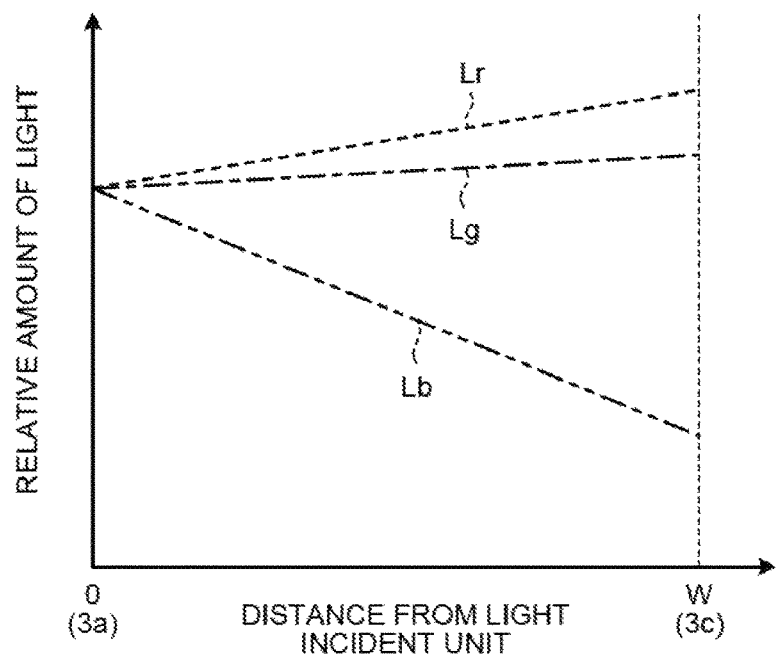
FIG. 6 is a diagram illustrating an example of a change in the relative amount of light for each wavelength component of the illumination light.

FIG. 6 is a diagram illustrating an example of a change in the relative amount of light for each wavelength component of the illumination light L0. The relative amount of light is obtained by standardizing the amount of light of the wavelength components, so that the sum of the amount of light of the wavelength components is a constant value. The horizontal axis of FIG. 6 indicates the distance (distance along the propagation direction of the illumination light L0) from the first end surface 3a that is a light incident unit. The vertical axis of FIG. 6 indicates the relative amount of light of red light Lr, green light Lg, and blue light Lb included in the illumination light L0. For the sake of convenience, in FIG. 6, the relative amount of light of the red light Lr, the green light Lg, and the blue light Lb are equal, at the first end surface 3a that is the light incident unit.

As illustrated in FIG. 6, the relative amount of light of the red light Lr, the green light Lg, and the blue light Lb change at rates different from each other, from the first end surface 3a toward the second end surface 3c. The change amount increases as the distance from the first end surface 3a increases. Because the change amount increases as the light has a shorter wavelength, the blue light Lb becomes insufficient in the vicinity of the second end surface 3c. Thus, the illumination light L0 becomes yellow.

The color of the illumination light L0 differs according to the distance that the illumination light L0 propagates through the inside of the polymer dispersed liquid crystal panel 4. Because the sub-illumination regions I are arranged side by side along the propagation direction of the illumination light L0, the color of the illumination light L0 that is emitted from the sub-illumination region I differs according to the distance (distance along the propagation direction of the illumination light L0) between each of the sub-illumination regions I and the first end surface 3a. Consequently, in the present embodiment, by taking into account the change in color of the illumination light L0, the amount of the second gradation value is adjusted according to the distance (distance along the propagation direction of the illumination light L0) between the sub-pixel PX and the first end surface 3a.

Figure 7:
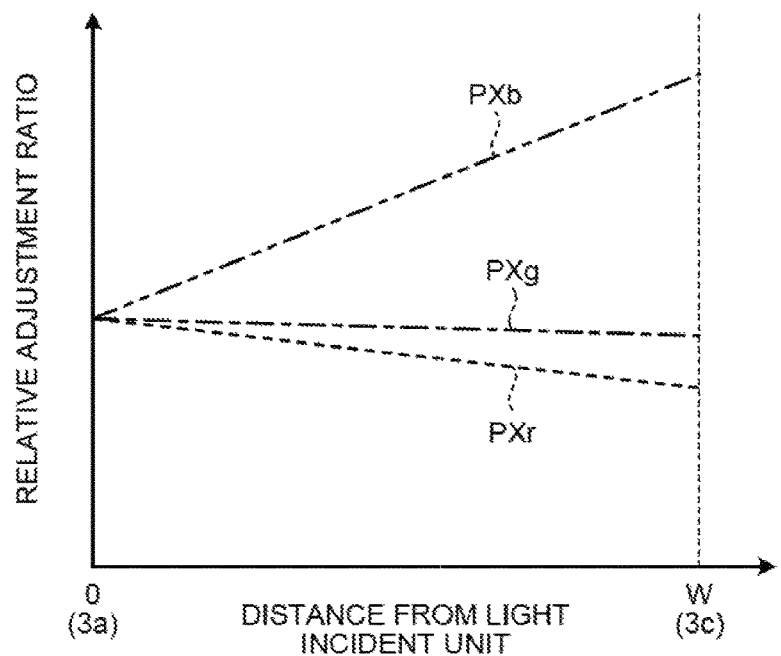
FIG. 7 is a diagram illustrating a relative adjustment ratio of a second gradation value of each sub-pixel.

FIG. 7 is a diagram illustrating a relative value of the adjustment ratio (relative adjustment ratio) of the second gradation value for each of the sub-pixels (red sub-pixel PXr, green sub-pixel PXg, and blue sub-pixel PXb). The horizontal axis of FIG. 7 indicates the distance (distance along the propagation direction of the illumination light L0) of each of the sub-pixels from the first end surface 3a that is the light incident unit. The vertical axis of FIG. 7 indicates the relative adjustment ratio of each of the sub-pixels. Using the second gradation value of the sub-pixel located closest to the first end surface 3a as a reference value, the adjustment ratio of the second gradation value of each of the sub-pixels is obtained by calculating the ratio (second gradation value/reference value) between the reference value and the second gradation value of each of the sub-pixels. The first gradation value to be referred to for calculating the second gradation value is the same for all the sub-pixels. The relative adjustment ratio of each of the sub-pixels is obtained by standardizing the adjustment ratio of each of the sub-pixels, so that the sum of the adjustment ratio of the sub-pixels becomes a constant value.

As illustrated in FIG. 7, the relative adjustment ratio and the adjustment ratio of each of the sub-pixels change according to the distance between the sub-pixel and the first end surface 3a. The relative adjustment ratio and the adjustment ratio increase, as the distance between the sub-pixel and the first end surface 3a increases. Consequently, the change in the amount of light of the illumination light L0 illustrated in FIG. 6 is canceled, thereby suppressing the color shift in the image. The relative adjustment ratio and the adjustment ratio differ according to the color displayed by the sub-pixel. The relative adjustment ratio and the adjustment ratio increase, as the sub-pixel displays color with a variable amount of light, when the illumination light L0 propagates through the inside of the polymer dispersed liquid crystal panel 4. For example, in the example of FIG. 7, the blue sub-pixel PXb has the largest relative adjustment ratio and the adjustment ratio. Thus, even if the amount of light of each color changes in different rates, and the color of the illumination light L0 changes according to the position in the propagation direction, a color shift hardly occurs in the image to be displayed.

For example, in the examples of FIG. 6 and FIG. 7, the chromaticity of the light incident unit (first end surface 3a) is (0.2728, 0.2528), and the chromaticity of the end unit (second end surface 3c) is (0.3404, 0.3569). If the relative amounts of light of the red light Lr, the green light Lg, and the blue light Lb in the light incident unit are R1, G1, and B1, respectively, and the relative amounts of light of the red light Lr, the green light Lg, and the blue light Lb in the end unit are R2, G2, and B2, respectively, the relative amount of light of each color light in the light incident unit and the end unit is as follows.

Light incident unit: Y(R1:0.208, G1:0.665, B1:0.128)
Input unit: Y(R2:0.240, G2:0.0706, B2:0.054)

As a result, the amount of light of each color light in the end unit becomes insufficient, compared to that of the light incident unit, as follows. Consequently, the color needs to be corrected so as to make the color uniform.

(R1/R2,G1/G2,B1/B2)=(R:0.864,G:0.942,B:2.373)

To standardize based on the light incident unit, the relative amount of light of each color light changes as follows.

(R2/R1,G2/G1,B2/B1)=(R:1.154,G:1.062,B:0.422)

In other words, while each color light propagates from the light incident unit to the end unit, the relative amount of light of the red light Lr changes from 1 to 1.154, the relative amount of light of the green light Lg changes from 1 to 1.062, and the relative amount of light of the blue light Lb changes from 1 to 0.422. The above is illustrated in FIG. 6. The relative amount of light of the red light Lr and the green light Lg increase in the end unit than those in the light incident unit. However, the actual amount of light of the red light Lr, the green light Lg, and the blue light Lb is all reduced in the end unit than that in the light incident unit.

To suppress the color shift, the adjustment ratio of the red sub-pixel PXr is 0.864, the adjustment ratio of the green sub-pixel PXg is 0.942, and the adjustment ratio of the blue sub-pixel PXb is 2.373, in the end unit. The above is illustrated in FIG. 7. By adjusting the second gradation value of each of the sub-pixels as in FIG. 7, it is possible to suppress the color shift on the entire display region.

As described above, in the display device 1 of the present embodiment, the relative adjustment ratio and the adjustment ratio of the second gradation value in each of the sub-pixels PX are controlled, based on the distance between the sub-pixel PX and the first end surface 3a, as well as the color that is displayed by the sub-pixel PX. Consequently, even if the color of the illumination light L0 changes while the illumination light L0 propagates through the inside of the polymer dispersed liquid crystal panel 4, a color shift hardly occurs in the image. Thus, it is possible to provide the display device 1 having an excellent display quality.

Second Embodiment

Figure 8:
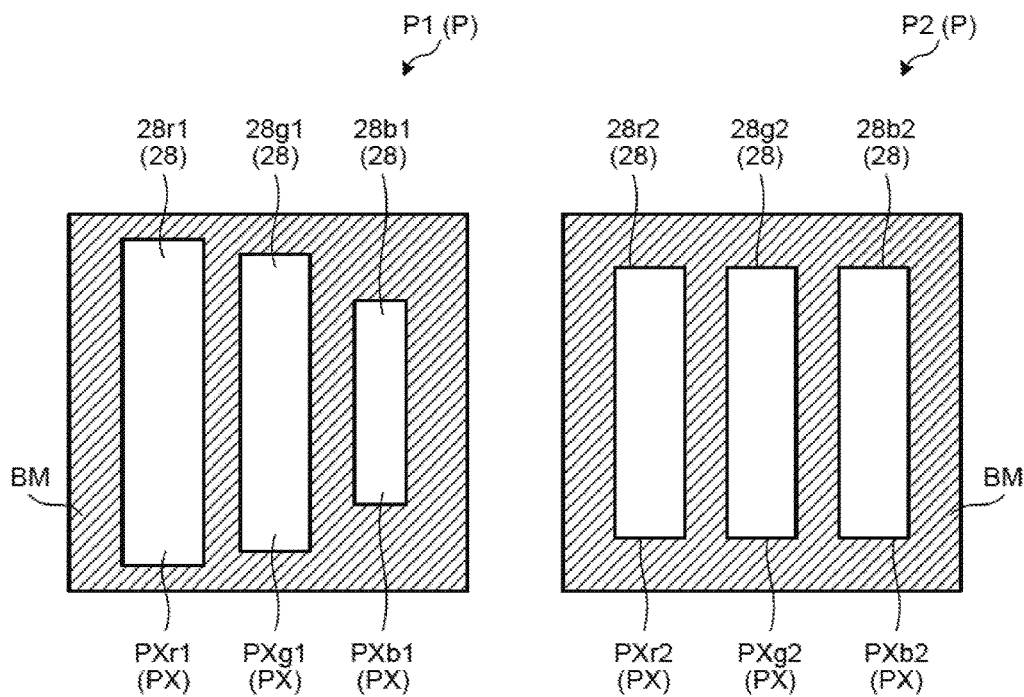
FIG. 8 is a plan view of pixels in a display device according to a second embodiment.

FIG. 8 is a plan view of pixels in a display device according to a second embodiment. Hereinafter, while referring to FIG. 1 or FIG. 4, the display device of the present embodiment will be described with reference to FIG. 8. In the present embodiment, the same reference numerals denote the same elements common to the first embodiment, and the detailed description thereof will be omitted.

The basic configuration of the display device of the present embodiment is the same as that of the display device 1 of the first embodiment. The display device of the present embodiment is different from that of the first embodiment in that the display panel 2 is a display panel in which the color of the color filter layer 28 is adjusted so as to cancel the change in a color of the illumination light L0, that is generated when the illumination light L0 propagates through the inside of the polymer dispersed liquid crystal panel 4. In the video signal control unit 40, the video signal VS is not corrected so as to cancel the change of the color in the illumination light L0. The color of the color filter layer 28 is adjusted, by adjusting at least one of value (also called brightness), saturation, and hue of each of the color filters 28f, according to the distance from the first end surface 3a. In the present embodiment, for example, the color shift in an image is suppressed, by changing the display area of the sub-pixel PX according to the distance from the first end surface 3a (distance along the propagation direction of the illumination light L0).

It is assumed that a light transmission quantity of the color filter layer 28 in each of the sub-pixels PX is a product of a light transmittance of the color filter layer 28 disposed in the sub-pixel PX and the display area of the sub-pixel PX. Consequently, the light transmission quantity of the color filter layer 28 in each of the sub-pixels PX that displays the identical color differs according to the distance between each of the sub-pixels PX and the first end surface 3a (see FIG. 3). The display area of the sub-pixel PX is an opening area of a black matrix BM that is provided so as to frame the sub-pixel PX. The light transmittance is visible light transmittance measured based on Japanese Industrial Standard (JIS).

The diagram at the left side of FIG. 8 is a plan view of a pixel P1 that is located closest to the first end surface 3a (see FIG. 3). The diagram at the right side of FIG. 8 is a plan view of a pixel P2 that is located furthest away from the first end surface 3a. The display area of a red sub-pixel PXr1 of the pixel P1 is larger than the display area of a red sub-pixel PXr2 of the pixel P2. The display area of a green sub-pixel PXg1 of the pixel P1 is larger than the display area of a green sub-pixel PXg2 of the pixel P2. The display area of a blue sub-pixel PXb1 of the pixel P1 is smaller than a blue sub-pixel PXb2 of the pixel P2. The light transmission quantity increases as the size of the display area increases. Consequently, the light transmission quantity of the color filter layer 28 in the red sub-pixel PXr1 and the green sub-pixel PXg1 of the pixel P1 is larger than the light transmission quantity of the color filter layer 28 in the red sub-pixel PXr2, the green sub-pixel PXg2, and the blue sub-pixel PXb2 of the pixel P2.

In the present embodiment, the display area of each of the sub-pixels PX that display the identical color differs according to the distance (distance along the propagation direction of the illumination light L0) between each of the sub-pixels PX and the first end surface 3a. Consequently, the light transmission quantity of the color filter layer 28 in each of the sub-pixels PX that displays the identical color differs according to the distance between each of the sub-pixels PX and the first end surface 3a.

The display area of each of the sub-pixels PX included in the identical pixel P differs according to each color displayed by the sub-pixel PX. It is assumed that a reference transmission quantity is the light transmission quantity in the sub-pixel PX being closest to the first end surface 3a, among the sub-pixels PX that display the identical color. It is also assumed that an adjustment ratio of the light transmission quantity in another sub-pixel PX is a ratio (light transmission quantity/reference transmission quantity) between the light transmission quantity in the another sub-pixel PX and the reference transmission quantity. Consequently, the adjustment ratio of the light transmission quantity in each of the sub-pixels PX included in the identical pixel P differs according to variability in the amount of each light, when the light of the color to be displayed by each of the sub-pixels PX propagates through the inside of the polymer dispersed liquid crystal panel 4.

It is assumed that the relative value of the adjustment ratio of the light transmission quantity of each of the sub-pixels (red sub-pixel PXr, green sub-pixel PXg, and blue sub-pixel PXb) is the relative adjustment ratio. Consequently, the relative adjustment ratio of the light transmission quantity in each of the sub-pixels (red sub-pixel PXr, green sub-pixel PXg, and blue sub-pixel PXb) changes similarly to that illustrated in FIG. 7. For example, the relative adjustment ratio and the adjustment ratio of the light transmission quantity in each of the sub-pixel increase, with the increase in the distance between each of the sub-pixels and the first end surface 3a. Consequently, the change in the amount of light of the illumination light L0 illustrated in FIG. 6 is cancelled, thereby suppressing the color shift in the image.

The relative adjustment ratio and the adjustment ratio of the light transmission quantity in each of the sub-pixels included in the identical pixel P differ according to variability in the amount of each light, when the light of the color to be displayed by the each of the sub-pixels PX propagates through the inside of the polymer dispersed liquid crystal panel 4 (see FIG. 3). The relative adjustment ratio and the adjustment ratio of the light transmission quantity increase, as the sub-pixel displays color with a variable amount of light. As illustrated in FIG. 6, in the polymer dispersed liquid crystal panel 4, the amount of light changes as the light has a shorter wavelength. Thus, the blue sub-pixel PXb has the largest relative adjustment ratio and the adjustment ratio. Consequently, even if the amount of light of each color changes in different rates, and the color of the illumination light L0 changes according to the position in the propagation direction, a color shift hardly occurs in the image to be displayed.

In this manner, in the present embodiment, the light transmission quantity of the color filter layer 28 in each of the sub-pixels PX is controlled based on the distance between the sub-pixel PX and the first end surface 3a. The relative adjustment ratio and the adjustment ratio of the light transmission quantity in each of the sub-pixels PX are controlled, based on the color to be displayed by the sub-pixel PX. Hence, even if the color of the illumination light L0 changes while the illumination light L0 propagates through the inside of the polymer dispersed liquid crystal panel 4, a color shift hardly occurs in the image. Consequently, it is possible to provide the display device having an excellent display quality.

Third Embodiment

Figure 9:
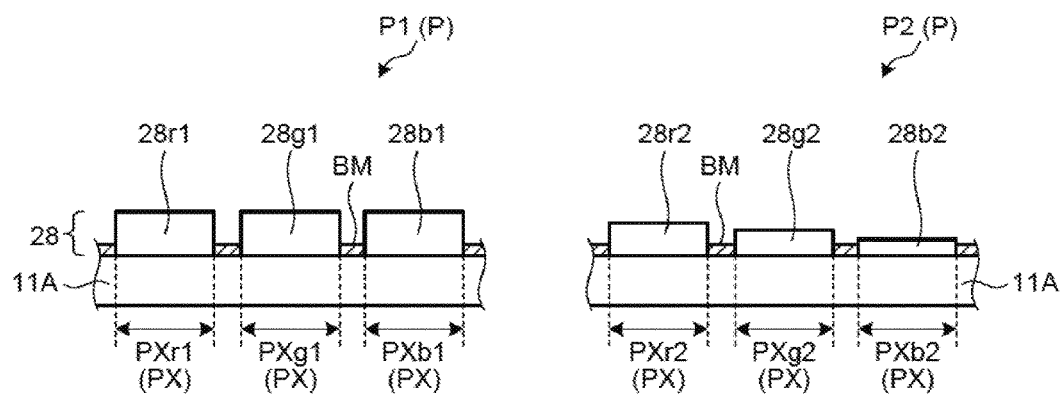
FIG. 9 is a sectional view of a color filter layer of a display device according to a third embodiment.

FIG. 9 is a sectional view of the color filter layer 28 of a display device according to a third embodiment. The diagram at the left side of FIG. 9 is a sectional view of the color filter layer 28 of the pixel P1 that is located closest to the first end surface 3a (see FIG. 3). The diagram at the right side of FIG. 9 is a sectional view of the color filter layer 28 of the pixel P2 that is located furthest away from the first end surface 3a. In the present embodiment, the same reference numerals denote the same constituent elements as those in the first embodiment and the second embodiment, and the detailed description thereof will be omitted.

The basic configuration of the display device of the present embodiment is the same as that of the display device 1 of the first embodiment. The display device of the present embodiment is different from that of the first embodiment in that the color shift in an image is suppressed by making the light transmittance of the color filter layer 28 be different, according to the distance (distance along the propagation direction of the illumination light L0) from the first end surface 3a.

In the present embodiment, the thickness of a red color filter 28r2 of the pixel P2 is smaller than the thickness of a red color filter 28r1 of the pixel P1. The thickness of a green color filter 28g2 of the pixel P2 is smaller than the thickness of a green color filter 28g1 of the pixel P1. The thickness of a blue color filter 28b2 of the pixel P2 is smaller than the thickness of a blue color filter 28b1 of the pixel P1. If the thickness of the color filter is small, the amount of light to be absorbed is small. Thus, the light transmittance increases. Consequently, the light transmittance of the color filter layer 28 of the red sub-pixel PXr2, the green sub-pixel PXg2, and the blue sub-pixel PXb2 of the pixel P2 is respectively larger than the light transmittance of the color filter layer 28 in the red sub-pixel PXr1, the green sub-pixel PXg1, and the blue sub-pixel PXb1 of the pixel P1.

The display area of each of the sub-pixels PX provided on the display region 2A (see FIG. 2) is equal to each other. Thus, the light transmission quantity of the color filter layer 28 of the red sub-pixel PXr2, the green sub-pixel PXg2, and the blue sub-pixel PXb2 of the pixel P2 is respectively larger than the light transmission quantity of the color filter layer 28 in the red sub-pixel PXr1, the green sub-pixel PXg1, and the blue sub-pixel PXb1 of the pixel P1.

The thickness of the color filter provided in each of the sub-pixels PX that displays the identical color differs according to the distance (distance along the propagation direction of the illumination light L0) between each of the sub-pixels PX and the first end surface 3a. Thus, the light transmission quantity of the color filter layer 28 in each of the sub-pixels PX that displays the identical color differs, according to the distance between each of the sub-pixels PX and the first end surface 3a (see FIG. 3). The thickness of the color filter provided in each of the sub-pixels PX included in the identical pixel P differs according to each color displayed by the sub-pixel PX. The adjustment ratio of the light transmission quantity of each of the sub-pixels PX included in the identical pixel P differs according to variability in the amount of each light, when the light of the color to be displayed by each of the sub-pixels PX propagates through the inside of the polymer dispersed liquid crystal panel 4.

In the present embodiment, the relative adjustment ratio of the light transmission quantity in each of the sub-pixels (red sub-pixel PXr, green sub-pixel PXg, and blue sub-pixel PXb) is also the same as that illustrated in FIG. 7. The relative adjustment ratio and the adjustment ratio of the light transmission quantity of each of the sub-pixels PX increase, as the distance between each of the sub-pixels PX and the first end surface 3a increases. Thus, the change in the amount of light of the illumination light L0 illustrated in FIG. 6 is cancelled, thereby suppressing the color shift in the image. The relative adjustment ratio and the adjustment ratio of the light transmission quantity of each of the sub-pixels PX included in the identical pixel P differ according to variability in the amount of each light, when the light of the color to be displayed by each of the sub-pixels PX propagates through the inside of the polymer dispersed liquid crystal panel 4 (see FIG. 3). The relative adjustment ratio and the adjustment ratio of the light transmission quantity increase, as the sub-pixel displays a color with a variable amount of light. Hence, even if the amount of light of each color changes in different rates and the color of the illumination light L0 changes by the position in the propagation direction, a color shift hardly occurs in the image to be displayed. Consequently, it is possible to provide the display device having an excellent display quality.

Fourth Embodiment

Figure 10:
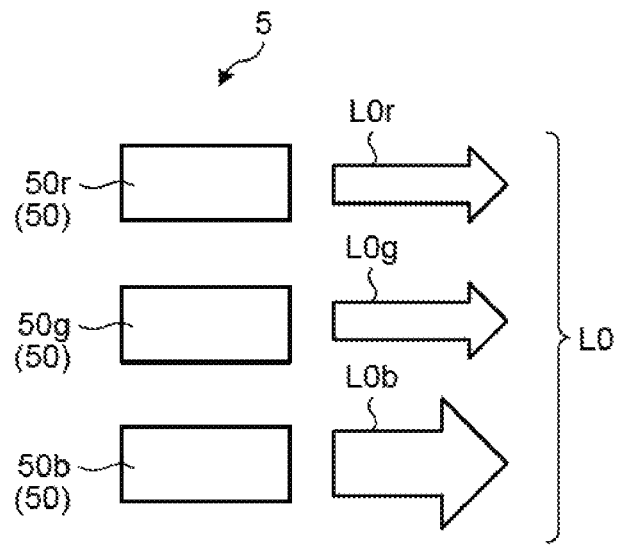
FIG. 10 is a plan view of pixels in a display device according to a fourth embodiment.

FIG. 10 is a diagram illustrating the light source device 5 of a display device according to a fourth embodiment. In the present embodiment, the same reference numerals denote the same constituent elements as those in the first embodiment, and the detailed description thereof will be omitted.

The basic configuration of the display device of the present embodiment is the same as that of the display device in the first embodiment. The display device of the present embodiment is different from that of the first embodiment in that the color of the illumination light L0 to be emitted from the light source device 5 is adjusted in consideration of the color shift that occurs inside the polymer dispersed liquid crystal panel 4.

The light source device 5 includes the light sources 50 each emitting light of one of colors different from each other. Among the light sources 50, one of the light sources 50 that emits light of a color with the most variable amount of light, when the light propagates through the inside of the polymer dispersed liquid crystal panel 4 (see FIG. 3), has the largest light emission amount. In the present embodiment, for example, the light source device 5 includes a red light source 50r that emits red light L0r, a green light source 50g that emits green light L0g, and a blue light source 50b that emits blue light L0b. When the amount of light of the blue light L0b is most variable, the blue light source 50b that emits the blue light L0b has the largest light emission amount. The light emission amount of each of the light sources 50 may differ according to variability in the amount of light in the polymer dispersed liquid crystal panel 4.

The illumination light L0 is formed of the red light L0r, the green light L0g, and the blue light L0b that are respectively emitted from the red light source 50r, the green light source 50g, and the blue light source 50b. The color of the illumination light L0 is color slightly shifted from white. For example, when white color light is propagated toward the second end surface 3c (see FIG. 4) from the first end surface 3a of the polymer dispersed liquid crystal panel 4, and when the white color light has changed to a certain color of light at the second end surface 3c, the light emission amount of each of the red light source 50r, the green light source 50g, and the blue light source 50b is adjusted, so that the illumination light L0 be the light of color that has a complementary relation with the certain color.

Figure 11:
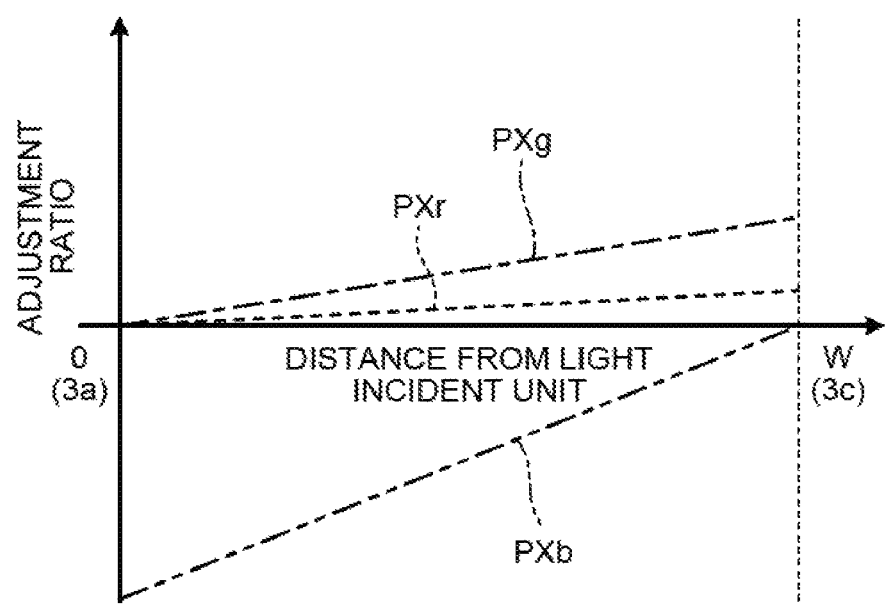
FIG. 11 is a diagram illustrating an adjustment amount of the second gradation value of each sub-pixel.

FIG. 11 is a diagram illustrating the adjustment amount of the second gradation value in each of the sub-pixels (red sub-pixel PXr, green sub-pixel PXg, and blue sub-pixel PXb). The horizontal axis of FIG. 11 indicates the distance (distance along the propagation direction of the illumination light L0) of each of the sub-pixels from the first end surface 3a that is the light incident unit. The vertical axis of FIG. 11 indicates the adjustment amount of each of the sub-pixels. Using the second gradation value of the sub-pixel that is located closest to the first end surface 3a as a reference value, the adjustment amount is obtained as a difference between the reference value and the second gradation value of each of the sub-pixels. The first gradation value to be referred to for calculating the second gradation value is the same for all the sub-pixels.

As illustrated in FIG. 11, the adjustment amount of each of the red sub-pixel PXr, the green sub-pixel PXg, and the blue sub-pixel PXb is changed according to the distance between the sub-pixel and the first end surface 3a. In the red sub-pixel PXr and the green sub-pixel PXb, the adjustment amount increases as the distance between the sub-pixel and the first end surface 3a increases. In the blue sub-pixel PXb, the adjustment amount is reduced as the distance between the sub-pixel and the first end surface 3a increases. Consequently, the change in the amount of light of the illumination light L0 caused by the attenuation of light illustrated in FIG. 6 is cancelled, thereby suppressing the color shift in the image. The adjustment amount differs according to the color displayed by the sub-pixel. Thus, even if the amount of light of each color light changes in different rates, and the color of the illumination light L0 changes according to the position in the propagation direction, the color shift hardly occurs in the image to be displayed.

In this manner, in the present embodiment, the light source 50 that emits the light of a color with the most variable amount of light, when the light propagates through the inside of the polymer dispersed liquid crystal panel 4, has the largest light emission amount. Hence, it is possible to emit a sufficient amount of light toward the display panel 2, even from the location further away from the first end surface 3a. Because a sufficient amount of light is supplied to the display panel 2, there is no need to adjust the second gradation value in the display panel 2, or adjust the light transmittance of the color filter layer 28. Consequently, it is possible to provide the display device having an excellent display quality.

Fifth Embodiment

Figure 12:
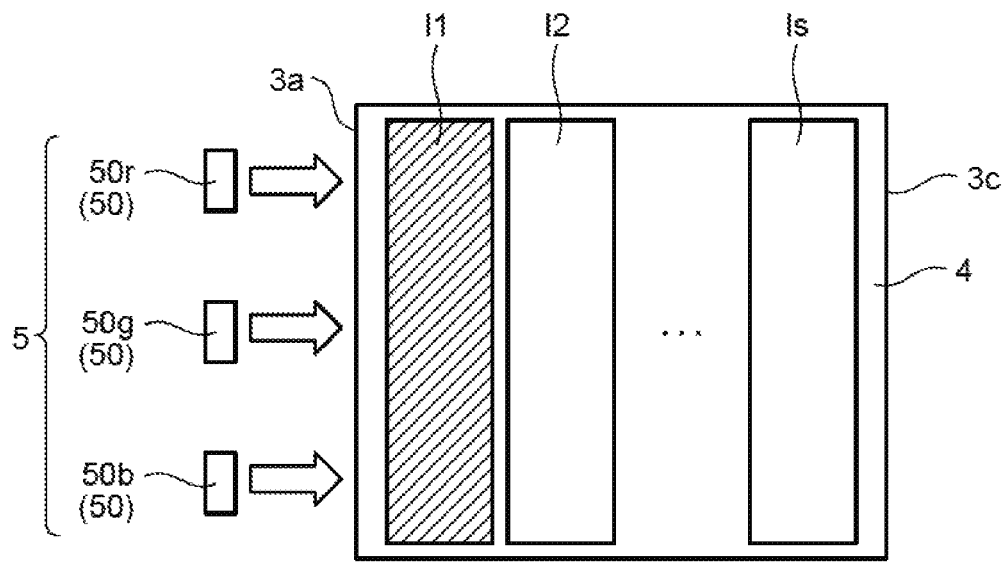
FIG. 12 is a diagram illustrating a backlight of a display device according to a fifth embodiment.
Figure 13:
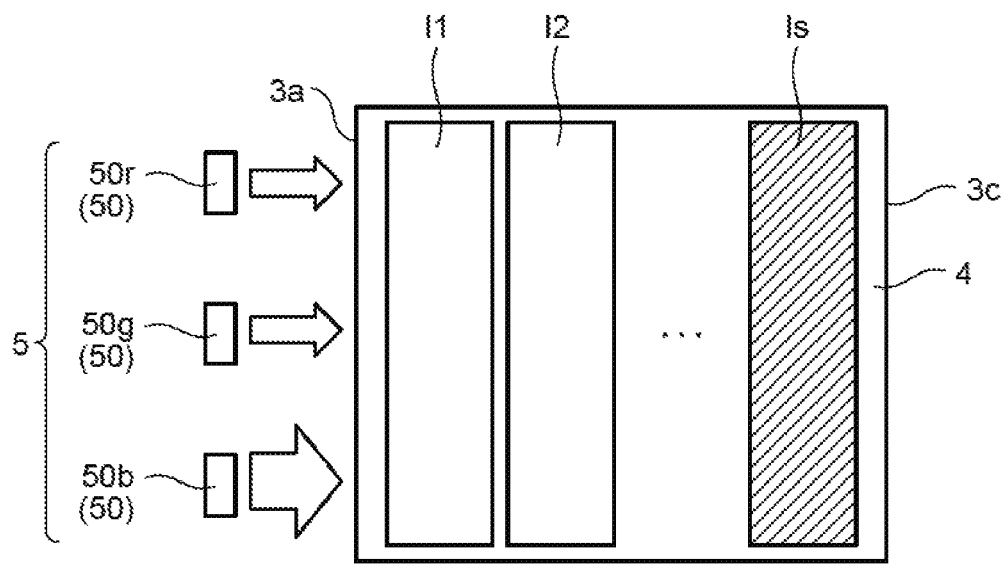
FIG. 13 is another diagram illustrating the backlight of the display device according to the fifth embodiment.

FIG. 12 and FIG. 13 are diagrams each illustrating a backlight of a display device according to a fifth embodiment. In the present embodiment, the same reference numerals denote the same constituent elements as those in the fourth embodiment, and the detailed description thereof will be omitted.

The basic configuration of the display device of the present embodiment is the same as that of the display device of the fourth embodiment. The display device of the present embodiment is different from that of the fourth embodiment in that the ratio between the light emission amount of the light source 50 that emits light of a color with the most variable amount of light, when the light propagates through the inside of the polymer dispersed liquid crystal panel 4, and the light emission amount of another light source 50 differs according to the location of the sub-illumination region I that will be in the scattering state.

Among the light sources 50, one of the light source 50 (blue light source 50b) that emits light of a color with the most variable amount of light, when the light propagates through the inside of the polymer dispersed liquid crystal panel 4, emits light more brightly when the sub-illumination region Is that is furthest away from the first end surface 3a is in the scattering state (FIG. 13), than when the sub-illumination region I1 that is closest to the first end surface 3a is in the scattering state (FIG. 12). Because the amount of light of the red light L0r and the green light L0g does not change as much as the blue light L0b, the red light L0r and the green light L0g constantly emit light of the same brightness, irrelevant to the location of the sub-illumination region I that will be in the scattering state.

In the present embodiment, it is also possible to emit a sufficient amount of the blue light L0b toward the display panel 2, from the location further away from the first end surface 3a. The light emission amount of the blue light L0b is small when the sub-illumination region I1 that is located closest to the first end surface 3a is in the scattering state. Thus, there is no need to largely differentiate the display areas of the blue sub-pixel, between the location close to the first end surface 3a and the location further away from the first end surface 3a.

While the preferred embodiments of the present invention have been described above, it is to be understood that the present invention is not limited to these embodiments. The disclosed embodiments are merely examples, and various other modifications may be made within the spirit and scope of the present invention. Appropriate modifications coming within the spirit and scope of the present invention naturally belong to the technical scope of the present invention.

The present invention is widely applicable to the display device according to the following aspects.

(1) A display device, comprising:
a polymer dispersed liquid crystal panel;
a light source device that emits illumination light to an end surface of the polymer dispersed liquid crystal panel;
a video signal control unit that corrects a video signal to generate a video control signal, the video signal being corrected so as to cancel a change in a color of the illumination light when the illumination light propagates through inside the polymer dispersed liquid crystal panel; and
a display panel that modulates the illumination light that has propagated through the inside of the polymer dispersed liquid crystal panel and is scattered by the polymer dispersed liquid crystal panel, based on the video control signal.

(2) The display device according to (1), wherein
the display panel includes a plurality of pixels;
each of the pixels includes a plurality of sub-pixels each displaying one of colors different from each other; and
a correction amount of the video signal to be supplied to each of the sub-pixels that displays an identical color, differs according to a distance between the sub-pixel and the end surface.

(3) The display device according to (2), wherein
the video signal and the video control signal include gradation information relating to a gradation value of each of the sub-pixels;
a first gradation value relates to gradation information included in the video signal;
a second gradation value relates to gradation information included in the video control signal; and
when an identical first gradation value is set for the sub-pixels that display the identical color, the second gradation value of each of the sub-pixels differs according to the distance between each of the sub-pixels and the end surface.

(4) The display device according to (3), wherein when the identical first gradation value is set for the sub-pixels included in an identical pixel, the second gradation value of each of the sub-pixels differs according to variability in an amount of each light, when the light of a color to be displayed by each of the sub-pixels propagates through the inside of the polymer dispersed liquid crystal panel.

(5) The display device according to any one of (1) to (4), wherein
the light source device includes a plurality of light sources each emitting light of one of colors different from each other; and
one of the light sources that emits light of a color with most variable amount of light, when the light propagates through the inside of the polymer dispersed liquid crystal panel, among the light sources, has a largest light emission amount.

(6) The display device according to any one of (1) to (5), wherein
the polymer dispersed liquid crystal panel includes a plurality of sub-illumination regions where switching between a scattering state in which the illumination light is scattered and a non-scattering state in which the illumination light is not scattered is independently controlled;

a distance between each of the sub-illumination regions and the end surface is different from each other;

the light source device includes a plurality of light sources each emitting light of one of colors different from each other;

one of the light sources that emits light of a color with most variable amount of light, when the light propagates through the inside of the polymer dispersed liquid crystal panel, among the light sources, emits light more brightly when the sub-illumination region that is furthest away from the end surface is in the scattering state, than when the sub-illumination region that is closest to the end surface is in the scattering state; and a ratio between a light emission amount of the light source that emits the light of the color with the most variable amount of light, when the light propagates through the inside of the polymer dispersed liquid crystal panel, and a light emission amount of another light source differs according to a location of the sub-illumination region be in the scattering state.

(7) A display device, comprising:
a polymer dispersed liquid crystal panel;
a light source device that emits illumination light to an end surface of the polymer dispersed liquid crystal panel; and
a display panel that includes a color filter layer and modulates the illumination light that has propagated through inside the polymer dispersed liquid crystal panel and is scattered by the polymer dispersed liquid crystal panel,
wherein a color of the color filter layer is adjusted, so as to cancel a change in a color of the illumination light when the illumination light propagates through the inside of the polymer dispersed liquid crystal panel.

(8) The display device according to (7), wherein
the display panel includes a plurality of pixels;
each of the pixels includes a plurality of sub-pixels each displaying one of colors different from each other;
the display panel includes the color filter layer that has a plurality of color filters corresponding to the sub-pixels, respectively;
a light transmission quantity of the color filter layer in each of the sub-pixels is a product of light transmittance of the color filter layer disposed in the sub-pixel and a display area of the sub-pixel; and
the light transmission quantity of the color filter layer in each of the sub-pixels that displays an identical color differs according to a distance between each of the sub-pixels and the end surface.

(9) The display device according to (8), wherein
a reference transmission quantity is a light transmission quantity in the sub-pixel that is closest to the end surface, among the sub-pixels that display the identical color;
an adjustment ratio of the light transmission quantity in another sub-pixel is a ratio between the light transmission quantity in the another sub-pixel and the reference transmission quantity; and
the adjustment ratio of the light transmission quantity in each of the sub-pixels included in an identical pixel differs, according to variability in an amount of each light when light of a color to be displayed by each of the sub-pixels propagates through the inside of the polymer dispersed liquid crystal panel.

(10) The display device according to (8), wherein the color filter disposed in the sub-pixel that is located furthest away from the end surface has a smaller thickness than the color filter disposed in the sub-pixel that is located closest to the end surface.

(11) The display device according to any one of (7) to (10), wherein
the light source device includes a plurality of light sources each emitting light of one of colors different from each other, and
one of the light sources that emits light of a color with most variable amount of light, when the light propagates through the inside of the polymer dispersed liquid crystal panel, among the light sources, has a largest light emission amount.

(12) The display device according to any one of (7) to (11), wherein
the polymer dispersed liquid crystal panel includes a plurality of sub-illumination regions in which switching between a scattering state in which the illumination light is scattered and a non-scattering state in which the illumination light is not scattered is independently controlled;
a distance between each of the sub-illumination regions and the end surface is different from each other;
the light source device includes a plurality of light sources each emitting light of one of colors different from each other;
one of the light sources that emits light of a color with most variable amount of light, when the light propagates through the inside of the polymer dispersed liquid crystal panel, among the light sources, emits brighter when the sub-illumination region that is furthest away from the end surface is in the scattering state, than when the sub-illumination region that is closest to the end surface is in the scattering state; and
a ratio between a light emission amount of the light source that emits the light of the color with the most variable amount of light, when the light propagates through the inside of the polymer dispersed liquid crystal panel, and a light emission amount of the other light source differs according to a location of the sub-illumination region in the scattering state.

What is claimed is:
1. A display device, comprising:
a polymer dispersed liquid crystal panel;
a light source device that emits illumination light to an end surface of the polymer dispersed liquid crystal panel;
a video signal control unit that corrects a video signal to generate a video control signal, the video signal being corrected so as to cancel a change in a color of the illumination light when the illumination light propagates through inside the polymer dispersed liquid crystal panel; and
a display panel that modulates the illumination light that has propagated through the inside of the polymer dispersed liquid crystal panel and is scattered by the polymer dispersed liquid crystal panel, based on the video control signal,
wherein:
the display panel includes a plurality of pixels;
each of the pixels includes a plurality of sub-pixels each displaying one of colors different from each other;
a correction amount of the video signal to be supplied to each of the sub-pixels that displays an identical color, differs according to a distance between the sub-pixel and the end surface;
the video signal and the video control signal include gradation information relating to a gradation value of each of the sub-pixels;
a first gradation value relates to gradation information included in the video signal;

a second gradation value relates to gradation information included in the video control signal; and when an identical first gradation value is set for the sub-pixels that display the identical color, the second gradation value of each of the sub-pixels differs according to the distance between each of the sub-pixels and the end surface.

2. The display device according to claim 1, wherein when the identical first gradation value is set for the sub-pixels included in an identical pixel, the second gradation value of each of the sub-pixels differs according to variability in an amount of each light, when the light of a color to be displayed by each of the sub-pixels propagates through the inside of the polymer dispersed liquid crystal panel.

3. The display device according to claim 1, wherein
the light source device includes a plurality of light sources each emitting light of one of colors different from each other; and
one of the light sources that emits light of a color with most variable amount of light, when the light propagates through the inside of the polymer dispersed liquid crystal panel, among the light sources, has a largest light emission amount.

4. A display device, comprising:
a polymer dispersed liquid crystal panel;
a light source device that emits illumination light to an end surface of the polymer dispersed liquid crystal panel;
a video signal control unit that corrects a video signal to generate a video control signal, the video signal being corrected so as to cancel a change in a color of the illumination light when the illumination light propagates through inside the polymer dispersed liquid crystal panel; and
a display panel that modulates the illumination light that has propagated through the inside of the polymer dispersed liquid crystal panel and is scattered by the polymer dispersed liquid crystal panel, based on the video control signal,
wherein
the polymer dispersed liquid crystal panel includes a plurality of sub-illumination regions where switching between a scattering state in which the illumination light is scattered and a non-scattering state in which the illumination light is not scattered is independently controlled;
a distance between each of the sub-illumination regions and the end surface is different from each other;
the light source device includes a plurality of light sources each emitting light of one of colors different from each other;
one of the light sources that emits light of a color with most variable amount of light, when the light propagates through the inside of the polymer dispersed liquid crystal panel, among the light sources, emits light more brightly when the sub-illumination region that is furthest away from the end surface is in the scattering state, than when the sub-illumination region that is closest to the end surface is in the scattering state; and
a ratio between a light emission amount of the light source that emits the light of the color with the most variable amount of light, when the light propagates through the inside of the polymer dispersed liquid crystal panel, and a light emission amount of another light source differs according to a location of the sub-illumination region be in the scattering state.

5. A display device, comprising:
a polymer dispersed liquid crystal panel;
a light source device that emits illumination light to an end surface of the polymer dispersed liquid crystal panel; and
a display panel that includes a color filter layer and modulates the illumination light that has propagated through inside the polymer dispersed liquid crystal panel and is scattered by the polymer dispersed liquid crystal panel,
wherein a color of the color filter layer is adjusted, so as to cancel a change in a color of the illumination light when the illumination light propagates through the inside of the polymer dispersed liquid crystal panel,
wherein
the display panel includes a plurality of pixels;
each of the pixels includes a plurality of sub-pixels each displaying one of colors different from each other;
the display panel includes the color filter layer that has a plurality of color filters corresponding to the sub-pixels, respectively;
a light transmission quantity of the color filter layer in each of the sub-pixels is a product of light transmittance of the color filter layer disposed in the sub-pixel and a display area of the sub-pixel; and
the light transmission quantity of the color filter layer in each of the sub-pixels that displays an identical color differs according to a distance between each of the sub-pixels and the end surface.

6. The display device according to claim 5, wherein
a reference transmission quantity is a light transmission quantity in the sub-pixel that is closest to the end surface, among the sub-pixels that display the identical color;
an adjustment ratio of the light transmission quantity in another sub-pixel is a ratio between the light transmission quantity in the another sub-pixel and the reference transmission quantity; and
the adjustment ratio of the light transmission quantity in each of the sub-pixels included in an identical pixel differs, according to variability in an amount of each light when light of a color to be displayed by each of the sub-pixels propagates through the inside of the polymer dispersed liquid crystal panel.

7. The display device according to claim 5, wherein the color filter disposed in the sub-pixel that is located furthest away from the end surface has a smaller thickness than the color filter disposed in the sub-pixel that is located closest to the end surface.

8. The display device according to claim 5, wherein
the light source device includes a plurality of light sources each emitting light of one of colors different from each other, and
one of the light sources that emits light of a color with most variable amount of light, when the light propagates through the inside of the polymer dispersed liquid crystal panel, among the light sources, has a largest light emission amount.

9. A display device, comprising:
a polymer dispersed liquid crystal panel;
a light source device that emits illumination light to an end surface of the polymer dispersed liquid crystal panel; and
a display panel that includes a color filter layer and modulates the illumination light that has propagated through inside the polymer dispersed liquid crystal panel and is scattered by the polymer dispersed liquid crystal panel,
wherein
a color of the color filter layer is adjusted, so as to cancel a change in a color of the illumination light when the illumination light propagates through the inside of the polymer dispersed liquid crystal panel,
the polymer dispersed liquid crystal panel includes a plurality of sub-illumination regions in which switching between a scattering state in which the illumination light is scattered and a non-scattering state in which the illumination light is not scattered is independently controlled;
a distance between each of the sub-illumination regions and the end surface is different from each other;
the light source device includes a plurality of light sources each emitting light of one of colors different from each other;
one of the light sources that emits light of a color with most variable amount of light, when the light propagates through the inside of the polymer dispersed liquid crystal panel, among the light sources, emits brighter when the sub-illumination region that is furthest away from the end surface is in the scattering state, than when the sub-illumination region that is closest to the end surface is in the scattering state; and
a ratio between a light emission amount of the light source that emits the light of the color with the most variable amount of light, when the light propagates through the inside of the polymer dispersed liquid crystal panel, and a light emission amount of the other light source differs according to a location of the sub-illumination region in the scattering state.

* * * * *